United States Patent
Whorf et al.

(10) Patent No.: US 12,298,426 B2
(45) Date of Patent: May 13, 2025

(54) LOW SWAP APERTURE FOR DIRECTION FINDING ACROSS EXTREME WIDE BAND

(71) Applicant: Raytheon Company, Waltham, MA (US)

(72) Inventors: Joshua A. Whorf, Marblehead, MA (US); Jacquelyn A. Vitaz, Medford, MA (US); Steven Carson, Washington, DC (US); Stephen Sekelsky, Princeton, NJ (US); Chad Wangsvick, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 717 days.

(21) Appl. No.: 17/242,347

(22) Filed: Apr. 28, 2021

(65) Prior Publication Data

US 2022/0349989 A1    Nov. 3, 2022

(51) Int. Cl.
*G01S 7/02* (2006.01)
*F41G 7/22* (2006.01)
(Continued)

(52) U.S. Cl.
CPC ............ *G01S 7/028* (2021.05); *F41G 7/2246* (2013.01); *F41G 7/2253* (2013.01);
(Continued)

(58) Field of Classification Search
CPC .. G01S 7/028; G01S 7/03; G01S 3/00; G05D 1/0083; G05D 1/0202–0208;
(Continued)

(56) References Cited

U.S. PATENT DOCUMENTS

| 3,045,238 A | 7/1962 | Cheston |
| 3,182,330 A | 5/1965 | Blume |

(Continued)

FOREIGN PATENT DOCUMENTS

| CN | 109860984 A | 6/2019 |
| JP | H01222200 A | 9/1989 |

(Continued)

OTHER PUBLICATIONS

L. Babu Saraswathi Kavitha and I. Jacob Raglend, "A wide-scan phased array antenna for a small Active Electronically Scanned Array: A review," 2013 International Conference on Circuits, Power and Computing Technologies (ICCPCT), Nagercoil, India, 2013, pp. 1008-1016, doi: 10.1109/ICCPCT.2013.6529010. (Year: 2013).*

(Continued)

*Primary Examiner* — Rami Khatib
*Assistant Examiner* — Paul Allen
(74) *Attorney, Agent, or Firm* — Suiter Swantz IP

(57) ABSTRACT

A wideband direction finding (WBDF) aperture employs a limited number of extreme wideband end-fire antenna elements capable of covering a wide frequency bandwidth. Arranging variable sized antenna elements in a specific pattern, the WBDF aperture enables direction finding capability covering an extreme wide frequency band. The pattern arrangement of variable sized elements offers the signal discernment to limit ambiguities in signal angle of arrival. This small form factor design enables the WBDF aperture to be mounted on the surface of a missile, munition, or small UAS wing or fuselage. The WBDF aperture offers a combination of differing sized antenna elements arranged in a specific pattern, combined with direction finding and signal tracking to provide an unambiguous relative azimuth and elevation angle of the target.

19 Claims, 9 Drawing Sheets

(51) Int. Cl.
*G01S 3/04* (2006.01)
*G01S 3/46* (2006.01)
*G01S 7/03* (2006.01)
*G01S 13/42* (2006.01)
*H01Q 1/28* (2006.01)
*H01Q 21/06* (2006.01)

(52) U.S. Cl.
CPC ............ *F41G 7/2286* (2013.01); *G01S 3/043* (2013.01); *G01S 3/46* (2013.01); *G01S 7/03* (2013.01); *G01S 13/42* (2013.01); *H01Q 1/286* (2013.01); *H01Q 21/061* (2013.01); *H01Q 21/067* (2013.01); *F41G 7/226* (2013.01)

(58) Field of Classification Search
CPC .......... G05D 1/042–046; G05D 1/0607–0688; G05D 1/0808–0866; G05D 1/10–12; H01Q 21/061–18; F41G 7/20–2293; F41G 7/00; B64U 20/80–83
USPC ...................................................... 701/2–18
See application file for complete search history.

(56) References Cited

U.S. PATENT DOCUMENTS

| | | | |
|---|---|---|---|
| 4,328,499 A | 5/1982 | Anderson et al. | |
| 4,460,901 A | 7/1984 | Tricoles et al. | |
| 4,494,121 A * | 1/1985 | Walter | H01Q 1/286 |
| | | | 343/708 |
| 5,381,150 A | 1/1995 | Hawkins et al. | |
| 5,469,165 A | 11/1995 | Milroy | |
| 5,767,814 A * | 6/1998 | Conroy | H01Q 25/02 |
| | | | 343/893 |
| 6,225,949 B1 * | 5/2001 | Guard | H01Q 3/242 |
| | | | 342/442 |
| 6,703,975 B1 | 3/2004 | Freeman | |
| 7,116,278 B2 | 10/2006 | Marsan et al. | |
| 8,912,968 B2 | 12/2014 | Sharma et al. | |
| 9,513,361 B1 | 12/2016 | Elsallal et al. | |
| 9,614,275 B2 | 4/2017 | Cicero | |
| 10,673,148 B1 * | 6/2020 | West | H01Q 21/245 |
| 11,450,962 B1 * | 9/2022 | Gustafson | H01Q 21/0025 |
| 2005/0012655 A1 * | 1/2005 | Lalezari | H01Q 25/02 |
| | | | 342/368 |
| 2011/0068980 A1 * | 3/2011 | Vered | H01Q 25/02 |
| | | | 342/432 |
| 2011/0304507 A1 * | 12/2011 | Mujahed | G01S 3/48 |
| | | | 342/417 |
| 2012/0181374 A1 | 7/2012 | Williams | |
| 2014/0209678 A1 * | 7/2014 | Factor | F41H 13/005 |
| | | | 342/53 |
| 2015/0171522 A1 * | 6/2015 | Liu | H01Q 21/20 |
| | | | 343/817 |
| 2015/0244078 A1 * | 8/2015 | Horner | H01Q 21/205 |
| | | | 343/770 |
| 2016/0100368 A1 * | 4/2016 | Sharma | H04W 52/0261 |
| | | | 455/574 |
| 2017/0069961 A1 * | 3/2017 | Cicero | H01Q 13/10 |
| 2018/0194463 A1 * | 7/2018 | Hasinski | B64U 30/20 |
| 2020/0256982 A1 * | 8/2020 | Slaven | G01S 3/043 |
| 2022/0094053 A1 * | 3/2022 | Jiang | H01Q 21/24 |
| 2022/0123464 A1 * | 4/2022 | Ying | H01Q 21/24 |

FOREIGN PATENT DOCUMENTS

| | | | | |
|---|---|---|---|---|
| WO | WO-2014184554 A2 * | 11/2014 | .......... | H01Q 13/085 |
| WO | 2022232269 A1 | 11/2022 | | |

OTHER PUBLICATIONS

Moo PW, DiFilippo DJ. Multifunction RF Systems for Naval Platforms. Sensors (Basel). Jun. 28, 2018; 18(7):2076. doi: 10.3390/s18072076. PMID: 29958465; PMCID: PMC6068503. (Year: 2018).*
Cartesian coordinate system—Wikipedia; https://en.wikipedia.org/wiki/Cartesian_coordinate_system via archive.org, captured Jan. 8, 2020 (Year: 2020).*
European Patent Office, Extended European Search Report received in EP Application No. 22796636.3, Sep. 24, 2024, 8 pages.
Israel Patent Office, Israel Office Action received in IL Application No. 308089, Aug. 29, 2024, 4 pages.
Japanese Patent Office, Japanese Office Action received in JP Application No. 2023-565394, Sep. 17, 2024, 9 pages.

* cited by examiner

LOW SWAP APERTURE FOR DIRECTION FINDING ACROSS EXTREME WIDE BAND

CROSS-REFERENCE TO RELATED APPLICATIONS

The present application is related to U.S. Pat. No. 9,614,275, entitled Methods and Apparatus for Wide Bandwidth Antenna with Enhanced Connection assigned to Raytheon Company (US) which is incorporated herein by reference.

BACKGROUND

Most radar antenna apertures capable of direction finding (monopulse, interferometry, etc) operate over specific limited frequency bands, thus requiring multiple apertures to cover a large band of frequencies. Traditional systems may employ multiple apertures to cover such a large frequency band.

Missile and unmanned aircraft systems (UAS) may have limited weight and space in which to carry an antenna. Each addition in weight and/or structure may have a direct and negative impact on drag and therefore, range. Multiple apertures may directly reduce range.

Therefore, a need remains for a system and related method which may overcome these limitations and provide a novel solution to a lightweight, small form factor antenna design capable of a wide frequency range and confident performance.

SUMMARY

One embodiment of the inventive concepts disclosed herein may be directed to a wideband direction-finding aperture comprising a single planar array having four or more antenna elements, one antenna element may be a first size and another antenna element may be a second size smaller than the first size. The single planar array may be configured, with each of the antenna elements working in tandem, for a signal reception of a wide frequency bandwidth to enable a direction finding (DF) of a target.

An additional embodiment of the inventive concepts disclosed herein may be directed to a system for wideband direction finding. The system may comprise a single planar array having four or more antenna elements configured, with each of the antenna elements working in tandem, for a signal reception of a wide frequency bandwidth. The antenna elements may be oriented in a pattern relative to an array center point which enables a resolution of an ambiguity within the signal reception.

For control, the system may include a vehicle controller operatively coupled with each of the antenna elements and with an aerial vehicle function. The vehicle controller may couple with a tangible, non-transitory memory configured to communicate with the vehicle controller, the tangible, non-transitory memory having instructions stored therein that, in response to execution by the vehicle controller, cause the vehicle controller to carry out each function of the system.

In function the system may receive a combined signal from the single planar array and determine if at least one measurement from the combined signal is an unrealistic measurement based on at least one of an azimuth or an elevation associated with the at least one measurement. The vehicle controller may discard the at least one unrealistic measurement as the ambiguity and process the combined signal to determine an azimuth and an elevation of a target. The vehicle controller may then, in response to the azimuth and elevation, command the aerial vehicle function to execute at least one vehicle function.

An additional embodiment of the inventive concepts disclosed herein may be directed to an aerial vehicle wideband direction finder. The direction finder may comprise a single planar array having four or more antenna elements and operatively associated with the aerial vehicle, the antenna elements may be configured for a signal reception and produce a combined signal. The antenna elements may be substantially non-overlapping and adjacent to at least one other antenna element, where at least one of the antenna element is smaller in size. The direction finder may include a vehicle controller operatively coupled with each of the antenna elements and with an aerial vehicle function and a tangible, non-transitory memory configured to communicate with the vehicle controller, the tangible, non-transitory memory having instructions stored therein that, in response to execution by the vehicle controller, cause the vehicle controller to carry out each function of the direction finder.

In function, the vehicle controller may determine if at least one measurement from the combined signal is an unrealistic measurement based on at least one of an azimuth or an elevation, discard the at least one unrealistic measurement as an ambiguity, and process the combined signal to determine an azimuth and an elevation of a target. The vehicle controller may then, in response to the azimuth and elevation, command the aerial vehicle function to execute at least one vehicle function.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Figure 1:
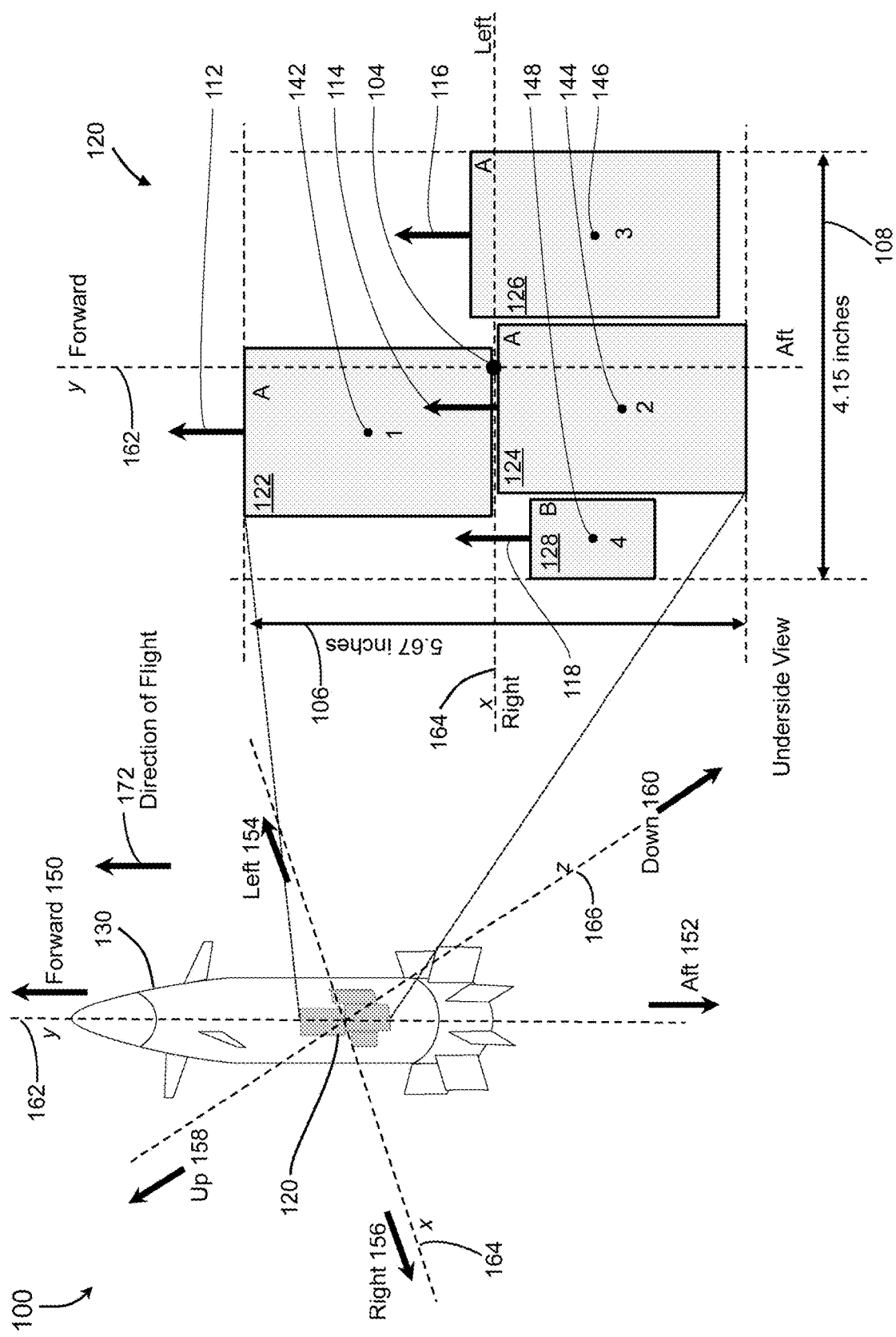
FIG. 1 is a diagram of one orientation of a wideband direction-finding aperture in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

As used herein the term "approximately" in claim language as well as specification language may refer to a range of values plus or minus twenty percent (+/−20%) of the claimed value. For example, "approximately 100" may refer to, and therefore claim, the range of 80 to 120.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

OVERVIEW

Broadly, embodiments of the inventive concepts disclosed herein are directed to a wideband direction finding (WBDF) aperture which employs a limited number of extreme wideband end-fire antenna elements capable of covering a wide frequency bandwidth. Arranging variable sized antenna elements in a specific pattern, the WBDF aperture enables correlative interferometry and provides direction finding capability covering an extreme wide frequency band. The pattern of variable sized elements offers the signal discernment to limit ambiguities in signal angle of arrival. This small form factor design enables the WBDF aperture to be mounted on the surface of a missile, munition, or small UAS wing or fuselage. The WBDF aperture offers a combination of differing sized antenna elements arranged in a specific pattern, combined with correlative interferometry and signal tracking to provide an unambiguous relative bearing and elevation angle of the target.

REFERENCE CHART

100 Orientation Diagram
104 Array Center Point
106 Array Length
108 Array Width
112 First Element Beam
114 Second Element Beam
116 Third Element Beam
118 Fourth Element Beam
120 Wideband (WB) Direction Finding (DF) Aperture
122 First Antenna Element
124 Second Antenna Element
126 Third Antenna Element
128 Fourth Antenna Element
130 Aerial Vehicle
132 Cable Connection
134 Element Cover
136 Elongated Aperture
142 First Element Center Point
144 Second Element Center Point
146 Third Element Center Point
148 Fourth Element Center Point
150 Y Axis Forward
152 Y Axis Aft
154 X Axis Left
156 X Axis Right
158 Z Axis Up
160 Z Axis Down
162 Y Axis
164 X Axis
166 Z Axis
172 Direction of Flight
200 Individual Element Diagrams
220 Elevation Beam Potential
222 Azimuth Beam Potential
300 Coordinate Diagram
400 Element Performance Diagram
402 Minimum Frequency (fMin)
404 Maximum Frequency (fMax)
422 First Frequency Segment
424 Second Frequency Segment
426 Third Frequency Segment
428 Fourth Frequency Segment
500 System Diagram
512 Downconverting, Digitization and Feature Extraction (DDF) 1
514 DDF 2

-continued

REFERENCE CHART

516 DDF 3
518 DDF 4
520 DF Processor
522 Vehicle Controller
524 Vehicle Function
526 Memory
600 Flight Profile Views
602 Launch Point
604 Surface Target
606 Sample Time Slice
700 WBDF Aperture Az El Performance
800 Angle Error Graphs FIG. 1 WBDF Aperture Referring now to FIG. 1, a diagram of one orientation 100 of a wideband direction-finding aperture in accordance with an embodiment of the inventive concepts disclosed herein is shown. Generally, a wideband direction-finding aperture (WBDF) 120 may include a planar array including an exemplary four elements 122 124 126 128 configured to operatively couple with an aerial vehicle 130. For orientation, the WBDF aperture 120 may mount on an underside of the aerial vehicle 130 where the WBDF aperture 120 may be in a position to image a potential surface target.

The WBDF aperture 120 may provide an array configuration with a unique offset layout, providing a direction finding (DF) performance while minimizing one or more ambiguities across a wideband of operational frequencies. The WBDF aperture 120 may include multiple apertures configured to cover the wideband spectrum of desired frequency coverage. In one embodiment, the WBDF aperture 120 may include a plurality of planar arrays of sufficient depth to enable sophisticated function via regularly spaced arrays (e.g., constant spacing between individual elements). The WBDF aperture 120 may provide an arrangement of conformal end-fire antennas oriented in a specific pattern enabling correlative interferometry direction finding.

In one embodiment, the aerial vehicle 130 may include a munition, a manned or unmanned aerial vehicle, or a spacecraft to which the WBDF aperture 120 is operative coupled. In one embodiment, the WBDF aperture 120 may couple with a weapons system or multi-function platform capable of both kinetic kill and electronic surveillance and attack. Some aerial vehicles 130 may employ multiple sensor systems to support various functions where the WBDF aperture 120 may be one of many onboard sensors.

In one embodiment, each of the aerial vehicle 130 and the planar array 122-128 may orient along a y axis 162 approximately parallel to a direction of flight 172, a z axis 166 approximately parallel with a weight vector of the aerial vehicle, and an x axis 164 approximately perpendicular to each of the y axis 162 and the z axis 166.

As used herein, a forward direction 150 may be parallel with the direction of flight 172 of the aerial vehicle 130 while an aft direction 152 may be opposite the direction of flight 172. A left direction 154 and right direction 156 may be opposite along the x axis 164 similar to wings on an aircraft. And finally, an up direction 158 and a down 160 direction may be oppositely oriented along the z axis 166 with the down direction 160 parallel with the weight vector of the aerial vehicle. Here, the forward 150 the up 158 and the left 154 directions may comply with a right-hand rule.

In one embodiment of the inventive concepts disclosed herein, the WBDF aperture 120 may be configured (e.g., length, width, depth, connectivity) for an insertion within an aperture cavity onboard the aerial vehicle. Some aperture cavity sizes may be variable and to minimize a size weight and power SWaP of the overall aerial vehicle and the aperture cavity may be limited to a planar or conformal orientation able to receive a limited size. The WBDF aperture 120 may be specifically sized to mount within the aperture cavity of one or more variety or aerial vehicle 130. In one embodiment, the WBDF aperture 120 may be specifically sized to insert within the aperture cavity of a munition.

In one embodiment, the WBDF aperture 120 may be oriented parallel with a horizontal plane defined by each of the y axis 162 and the x axis 164. Here, the WBDF aperture 120 may be oriented toward the down direction 160 with each of the beams 112-118 able to image a target physically below (down 160) and forward 162 of the WBDF aperture 120.

For additional orientation, the WBDF aperture 120 may have an array center point 104 coincident with the z axis 166 of the planar array. The array center point 104 may be useful in defining a relative position of each of the individual elements 122-128 as a relative distance within the horizontal plane from the array center point 104.

In one embodiment of the inventive concepts disclosed herein, each of the individual elements 122-128 may be configured for a signal reception of a wide frequency bandwidth to enable a wide band correlative phase interferometric direction finding of the target. Within the signal reception, ambiguities may be present in the received signals which may cause an erroneous positioning of the target. In one embodiment, the WBDF aperture 120 may be configured to enable an aerial vehicle signal processor to limit one or more ambiguities associated with the signal reception.

In one embodiment of the inventive concepts disclosed herein, each antenna element of the planar array may be mounted adjacent to another antenna element of the planar array without an overlap. In one exemplary embodiment, the individual elements may be positioned within the WBDF aperture 120 directly adjacent to one side of another individual element. Another exemplary embodiment may include a small spacing between one individual element and the next. As a smaller overall size of the WBDF aperture 120 may be desirable, a smaller spacing (e.g., between elements) may also be desirable. In one embodiment, an array length 106 may approximate 5.67 inches along they axis 162 while an array width 108 may approximate 4.15 inches along the x axis 164. In one embodiment, the single planar array may be approximately 4.7 to 6.7 inches along the y axis by approximately 3.1 to 5.1 inches along the x axis.

In one embodiment, the WBDF aperture 120 may be oriented approximately planar with the horizontal plane. As mentioned above, to image a target on the surface, a forward field-of-view within approximately 90 degrees of the y axis in azimuth combined with a vertical down field-of-view of approximately within +/−90 degrees of the down z axis may enable the WBDF aperture 120 to image the surface target.

In one embodiment, the WBDF aperture 120 may be configured in a planar shape to seamlessly mount on the underside of a specific aerial vehicle 130. For example, one embodiment of the WBDF aperture 120 mounted on a wing or fuselage of an aircraft may be approximately planar in shape to match the plane of the aircraft exterior. Also, some embodiments may include a curved version of the WBDF aperture 120 to conform with an exterior shape of the aerial vehicle 130. For example, a munition with an outside diameter of 24 inches may maintain a specific external curvature. The WBDF aperture 120 may be conformally shaped to match the specific exterior curvature.

In one embodiment, the WBDF aperture 120 may include a first antenna element 122 having a first element size (A), the first antenna element 122 configured for the signal reception of a first segment of the wide frequency bandwidth via a first element beam pattern 112, the first antenna element having a first element center point 142.

In one embodiment, the WBDF aperture 120 may include a second antenna element 124 having the first element size (A), the second antenna element 124 may be configured for the signal reception of a second segment of the wide frequency bandwidth via a second element beam pattern 114, the second antenna element 124 having a second element center point 144. Each center point of each antenna element may be approximately centered between the length (y axis) and width (z axis) of the individual antenna element In one embodiment, the WBDF aperture 120 may include a third antenna element 126 having the first element size (A), the third antenna element 126 may be configured for the signal reception of a third segment of the wide frequency bandwidth via a third element beam pattern 116, the third antenna element 126 having a third element center point 146.

In one embodiment, the WBDF aperture 120 may include a fourth antenna element 128 having a second element size (B) approximately half of the first element size (A), the fourth antenna element 128 configured for the signal reception of a fourth segment of the wide frequency bandwidth via a fourth element beam pattern 118, the fourth antenna element 128 having a fourth element center point 148. In one embodiment, the first and the second element sizes may be rectangular.

Contemplated herein, the size and position of each antenna element 122-128 may be adjusted and remain within the scope of the inventive concepts herein. One constant herein however, may be the plurality of inexpensive and desirable low power consumption individual antenna elements closely spaced and arranged to create the WBDF aperture 120.

FIG. 2 Individual Elements

Figures 2A, 2B:
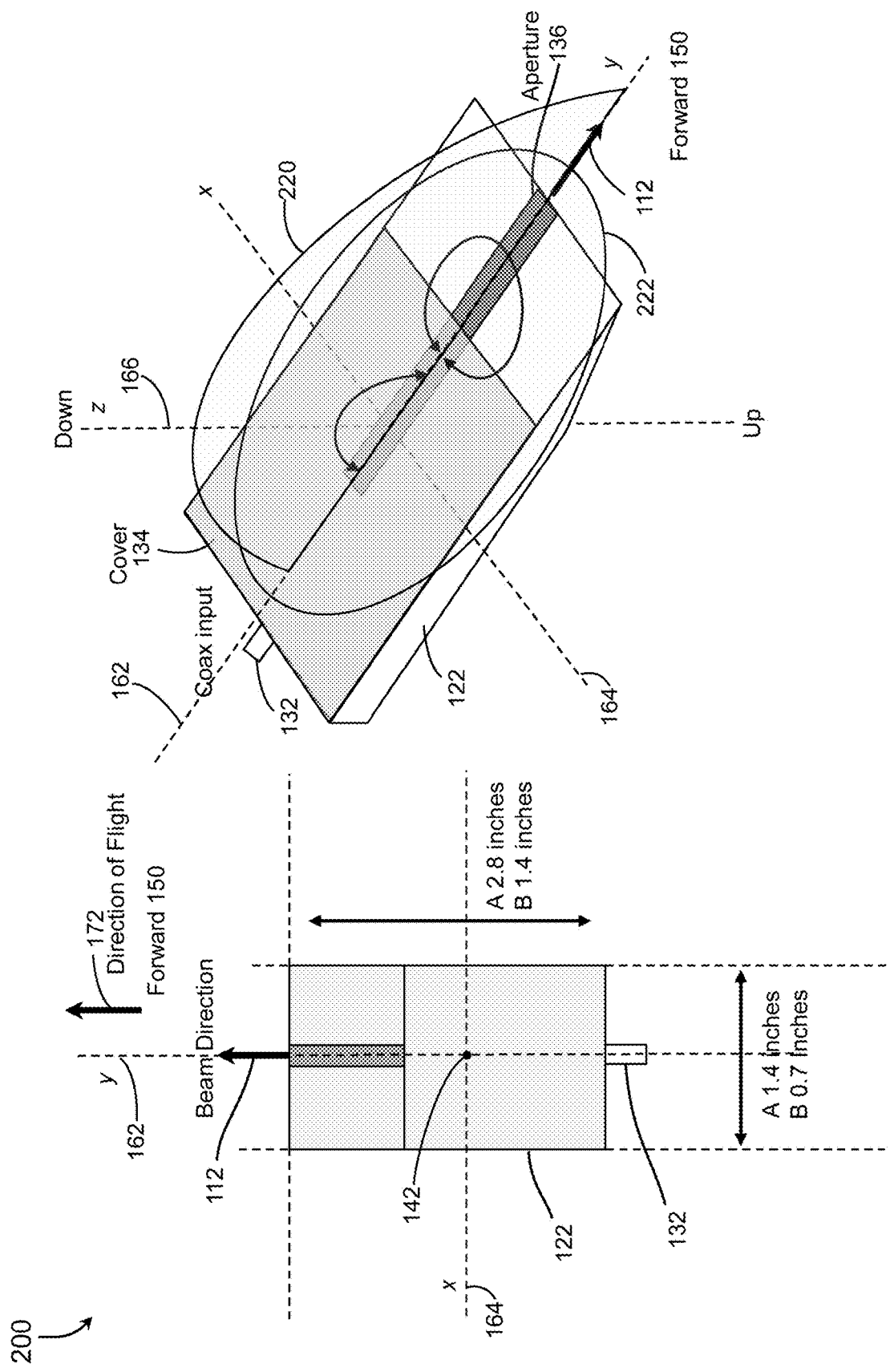
FIGS. 2A and 2B are diagrams of an individual antenna element in accordance with an embodiment of the inventive concepts disclosed herein.

Referring now to FIGS. 2A and 2B, diagrams of an individual antenna element 300 in accordance with an embodiment of the inventive concepts disclosed herein are shown. An exemplary individual antenna element (shown here the first antenna element 122) may perform individual elemental function and, when combined with additional elemental function of the plurality of elements, may provide an overall function of the WBDF aperture 120.

In one embodiment of the inventive concepts disclosed herein, each antenna element of the planar array may be a directive, instantaneous wide bandwidth planar antenna including an elongated dielectric feed aligned with they axis. In one embodiment, each individual element 122-128 may be similar to the antenna element disclosed in U.S. Pat. No. 9,614,275 yet sized to conform with the WBDF aperture 120. Each individual antenna element may be individually powered and configured to operatively couple with the aerial vehicle via a cable. In one embodiment, the cable may be a coax type of cable for individual element connectivity. The antenna element 122 may include a cover 134 and couple to the aerial vehicle 130 via a cable connection 132. In some embodiments, the antenna element 122 may include an aperture 136 associated with the elongated dielectric feed to provide transmission and reception of radar energy.

In one embodiment of the inventive concepts disclosed herein, the WBDF aperture 120 may provide a wide bandwidth high directivity, linear polarization in a shallow conformal package. The WBDF aperture 120 may provide a wide instantaneous frequency bandwidth corresponding with a highly directive focused bean with a front to back ratio of approximately 25 dB at a higher frequency within the wide bandwidth. When used in conjunction with a rear facing communications antenna (not pictured), the WBDF aperture 120 may enable desirable available gain for Precision Target Signatures (PTS) radar performance.

In one embodiment, the first size may approximate 2.8 inches (approximately 2.3 to 3.3 inches) along the y axis 162 by 1.4 inches (0.9 to 1.9 inches) along the x axis 164 and the second size may approximate 1.4 inches (0.9 to 1.9 inches) along the y axis 162 by 0.7 inches (0.2 to 1.2 inches) along the x axis 164. In some embodiments, each individual antenna element and therefore the WBDF aperture 120 may maintain a depth along the z axis of approximately less than 0.25 inches and, in some embodiments, 0.15 inches. With the additional cover 134 of approximately 0.050 inches, one exemplary overall thickness may be 0.20 inches.

In one embodiment, the antenna elements 122 may be scaled to achieve higher or lower frequencies to widen the available bandwidth. For example, a smaller size element may enable a higher frequency potential while a larger size individual element may enable a lower frequency. In some embodiments, the WBDF aperture 120 may be Insensitive to manufacturing tolerances and materials variation, At low frequencies, a larger spacing between each of the individual elements 122 may be beneficial where elements may be of sufficient size (A, B smaller, larger) to limit the spacing whereas at higher frequencies, a smaller elemental spacing may be desired. A limitation in a physical size of the cavity into which the wideband DF aperture 120 may be fitted may be a determining factor in overall size of the WBDF aperture 120. In one embodiment, a smaller element may enable a reduction in spacing from the center of one to the center of another along each of an x axis 164 and y axis 162 to enable a higher frequency performance and capability.

In one embodiment of the inventive concepts disclosed herein, the WBDF aperture 120 may be configured for a forward field-of-view with an azimuth potential 222 of within approximately +/−180 degrees of the forward y axis 162 and an elevation potential 220 of approximately +/−90 degrees of the down z axis 166. In some embodiments, the elevation potential 220 may be substantially greater than the indicated 180 degrees depending on aerial vehicle structure, vehicle size, and available radar penetration of the vehicle structure.

FIG. 3 Arrangement

Figure 3:
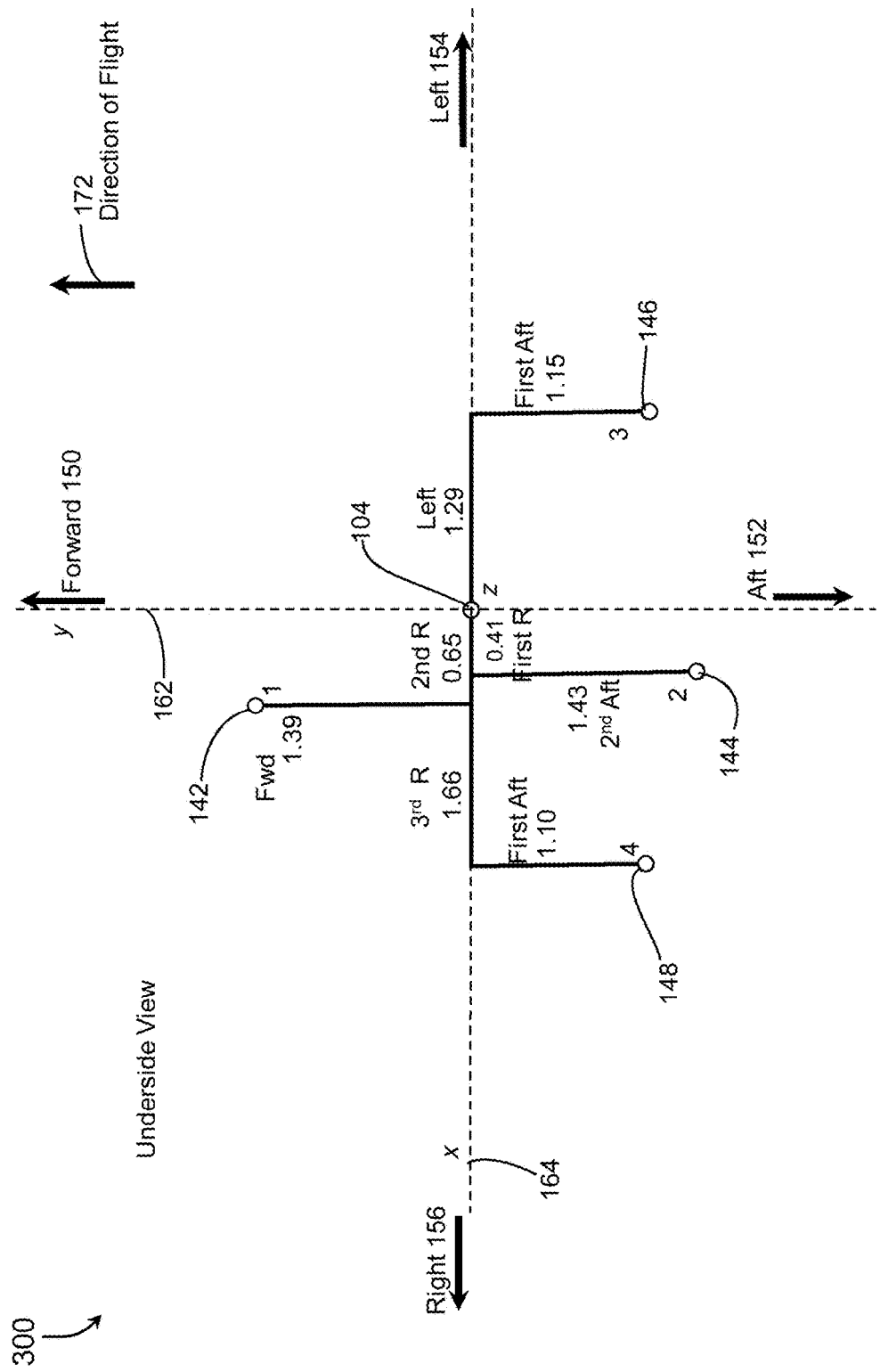
FIG. 3 is a diagram of an element coordinate separation exemplary of an embodiment of the inventive concepts disclosed herein.

Referring now to FIG. 3, a diagram of an element coordinate separation 300 exemplary of an embodiment of the inventive concepts disclosed herein is shown. Each individual element 122-128 may be slightly offset from another to reduce the direction of arrival ambiguity estimated from the relative phase of the received signal at each element. These precise signals may enable an overall capability of the WBDF aperture 120 to achieve high certainty of target location. Staggering the center position of each of the elements with respect to the array center point 104 may function to reduce ambiguities across the entirety of the frequency bandwidth.

Exemplary distances from the center point 104 may be represented by the following table:

| Direction from Center 104 | Value (In) |
|---|---|
| FWD | 1.39 |
| First Aft | 1.10-1.15 |
| Second Aft | 1.43 |
| Left | 1.29 |
| First Right | 0.41 |
| Second Right | 0.65 |
| Third Right | 1.66 |

In one embodiment, the first element center point 142 may be oriented a forward distance and a second right distance from the array center point 104. In one embodiment, the forward distance may approximate 1.39 inches and the second right distance may approximate 0.65 inches.

In an additional embodiment, the second element center point 144 may be oriented a second aft distance and a first right distance from the array center point 104. In one embodiment, the second aft distance may approximate 1.43 inches and the first right distance may approximate 0.41 inches.

In another embodiment, the third element center point 146 may be oriented a first aft distance and a left distance from the array center point 104. In one embodiment, the left distance may approximate 1.29 inches and first aft distance may approximate 1.15 inches.

In one embodiment, the fourth element center point 146 may be oriented approximately the first aft distance and a third right distance from the array center point 104. In one embodiment, the third right distance may approximate 1.66 inches.

Here, the first aft distance may be less than the second aft distance and the first right distance may be less than the second right distance which is also less than the third right distance.

In one embodiment, the forward distance may be approximately 1.0 to 2.0 inches, the first aft distance may be approximately 0.7 to 1.7 inches, and the second aft distance may be approximately 1.0 to 2.0 inches, the left distance may be approximately 0.8 to 1.8 inches, the first right distance may be approximately 0.1 to 1.1 inches, the second right distance may be approximately 0.1 to 1.1 inches, and the third right distance may be approximately 1.1 to 2.1 inches.

In one embodiment, the four antenna elements may be oriented in a pattern relative to the array center point 104. The pattern orientation and spacing may enable an ambiguity resolution of the signal reception. In one embodiment, the pattern may include one antenna element oriented forward of the center point 104, one or more antenna elements oriented aft of the center point 104, one antenna element oriented left of the center point 104, and one or more antenna element oriented right of the center point 104.

Figure 4:
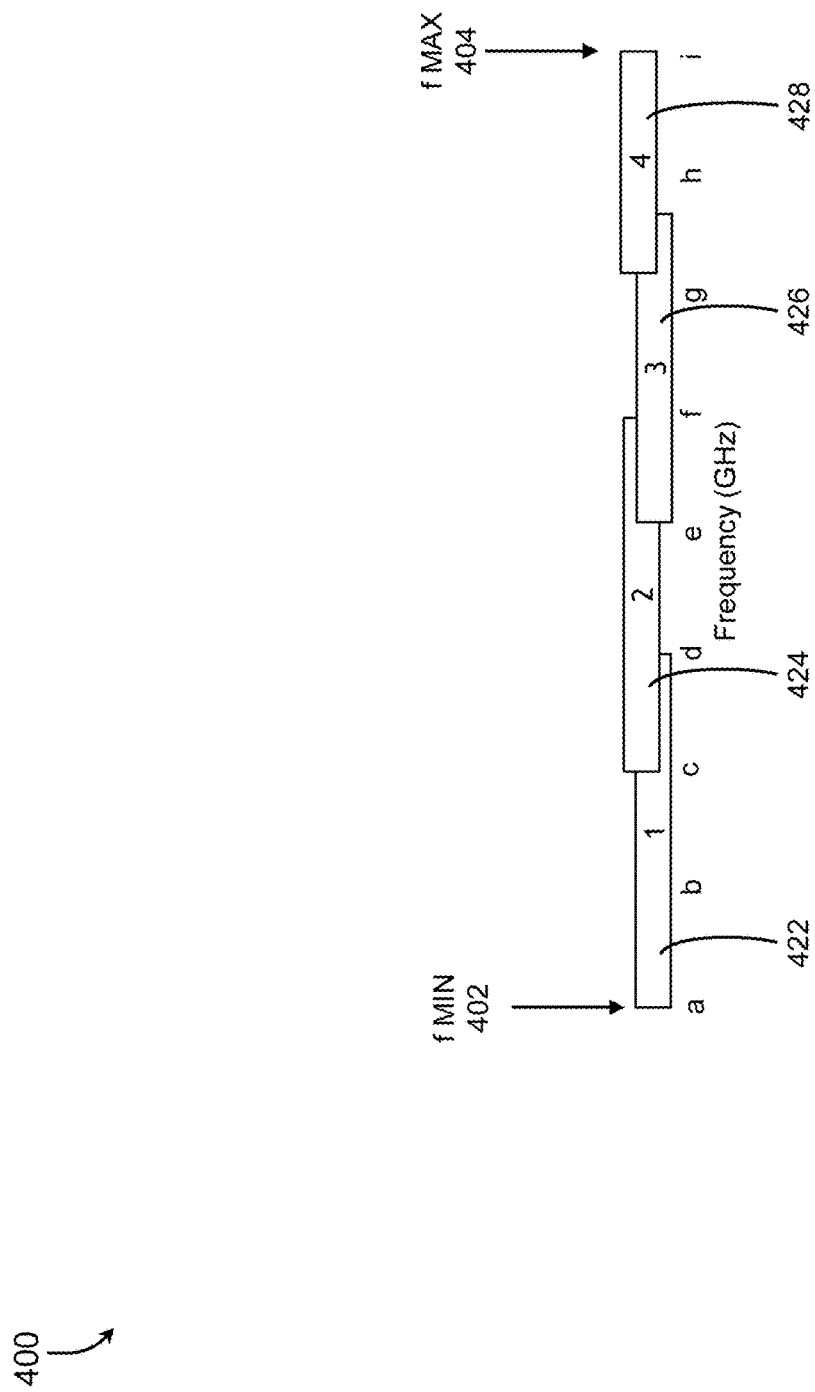
FIG. 4 is a diagram of one aperture bandwidth exemplary of one embodiment of the inventive concepts disclosed herein.

FIG. 4 Aperture Bandwidth

Referring now to FIG. 4, a diagram of one aperture bandwidth 400 exemplary of one embodiment of the inventive concepts disclosed herein is shown. In one embodiment, the WBDF aperture 120 may segment the wide bandwidth of the array capability into individual segments for each individual antenna element 122-128. A first element frequency segment 422, a second element frequency segment 424, a third element frequency segment 426, and a fourth element frequency segment 428 may correspond to each individual antenna element. For example, the first antenna element 122 may be assigned the first frequency segment 422, the second antenna element 124 the second segment 424, etc.

In another embodiment, each frequency segment may be assigned to an individual antenna element based on the element relative position from the center point 104. For example, a specific frequency segment (3, for example) may be one at which the WBDF aperture 120 may be specifically targeted. In this manner, an operator may tailor the desired frequency to the desired antenna element and thus, tailor the overall aperture performance.

In one embodiment of the inventive concepts disclosed herein, each of the first segment 422 through the fourth segment 428 of the wide frequency bandwidth is approximately three to five (3-5) GHz wide. For example, the first antenna element 122 may be configured to cover an exemplary frequency segment 422 width from frequency a to frequency d. Similarly, the second antenna element 124 may be configured to cover a second segment 424 from frequency c to frequency f. In addition, one segment of the wide frequency bandwidth may be inversely proportional to the second element size.

In one embodiment, one of the first through the fourth segments of the wide frequency bandwidth may include a set of frequencies where a fractional bandwidth of the set of frequencies is greater than 1. For example, the fractional bandwidth may be defined as:

$$(fMax-fMin)/(0.5*(fMax+fMin))$$

where fMax 404 (frequency I) may be one highest frequency of operation and fMin 402 (frequency A) may be one lowest frequency of operation.

In one exemplary embodiment, the wide frequency bandwidth may extend from the fMin 401 to the fMax 404 depending on a specification of a user. For example, one exemplary wide bandwidth may extend from a C-band (4 GHz) to a Ka-band 40 GHz) while another exemplary wide frequency bandwidth may extend from an L band (1 GHz) to a Ku band (18 GHz). These non-limiting examples may serve to indicate the wide frequency bandwidth may be tailored based on a need of the user and overall aperture dimension.

In one embodiment, the WBDF aperture 120 employing the planar array may be either active, passive, or semi-active to function appropriately with the aerial vehicle to which it is coupled. For example, an aerial vehicle 130 directed at an active emitter may function passively while a UAS may require an active function for ground mapping.

FIG. 5 System

Figure 5:
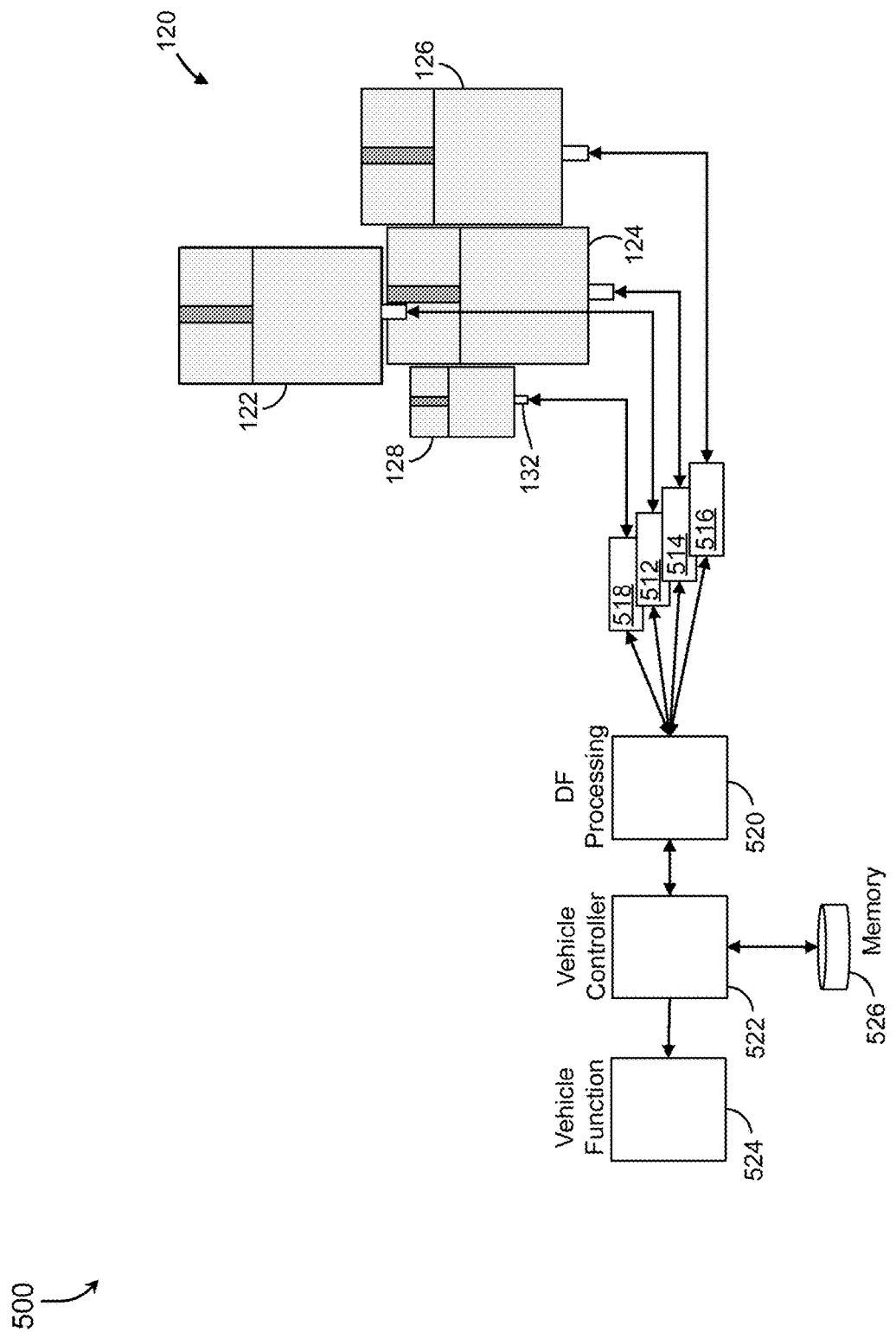
FIG. 5 is a diagram of a system for wideband direction finding in accordance with one embodiment of the inventive concepts disclosed herein.

Referring now to FIG. 5, a diagram of a system for wideband direction finding 500 in accordance with one embodiment of the inventive concepts disclosed herein is shown. In operation, a system 500 may employ the WBDF aperture 120 to perform one or more functions.

In one embodiment of the inventive concepts disclosed herein, the system 500 may include the WBDF aperture 120 where each individual antenna element may operatively couple with the aerial vehicle 130 via the cable connection 132.

In embodiments, the system 500 may include a down conversion, digitization and feature extraction 512-518 via a down converter individually coupled with each of the individual antenna elements 122-128. A direction finding (DF) processor 520 may function to combine each of the individual signals and communicate the combined signal to a vehicle controller 522. The vehicle controller 522 may operatively couple with each of the elements of the planar array and a vehicle function 524.

For control, a tangible, non-transitory memory 526 may be configured to communicate with the vehicle controller 522, the tangible, non-transitory memory 526 may have instructions stored therein that, in response to execution by the vehicle controller 522, cause the vehicle controller 522 to carry out each function of the system 500.

In function, the vehicle controller 522 may receive a combined signal from the planar array within the WBDF aperture 120 and determine if at least one measurement from the combined signal is an unrealistic measurement based on an azimuth and an elevation associated with the at least one measurement. Here, as the vehicle controller 522 may operate to eliminate ambiguity associated with the received signal, the vehicle controller 522 may discard the unrealistic measurements as an ambiguity.

In one embodiment, the vehicle controller 522 may also process the received signal using correlative phase interferometric direction finding to determine an azimuth and elevation angle of the target and, in response to the azimuth and the elevation angle, command the vehicle function 524 to execute at least one vehicle function.

In one embodiment, the vehicle function may include an autopilot command to fly the aerial vehicle 130, a camera function to perform one or more imaging via a separate system, one or more additional functions associated with the vehicle, and a directive for semi-active radar function to alter a radar mode of the WBDF aperture 120.

In one embodiment, the measurement may include an azimuth measurement coupled with an elevation measurement where the vehicle controller 522 analyzes each of the azimuth measurement and elevation measurement within a lookup table within the memory 526 to determine the ambiguity. Another embodiment may include the vehicle controller 522 functioning to discard a first measurement and a second measurement to use a third or possibly a fourth measurement to determine the azimuth and elevation.

FIG. 6 Flight Profile

Figure 6A:
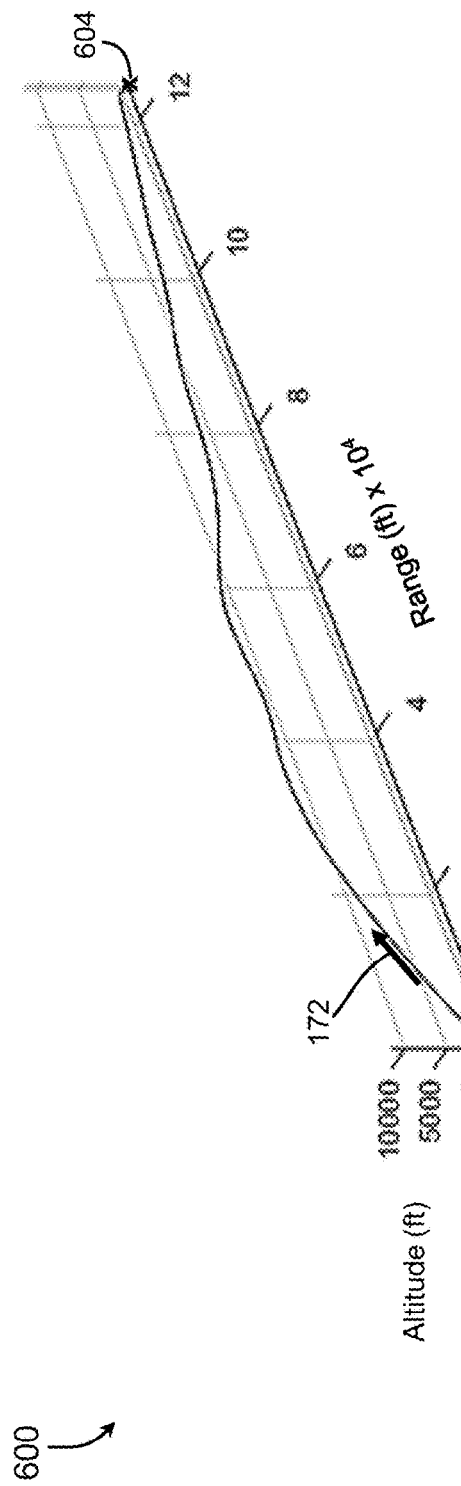
FIGS. 6A and 6B are graphs of an exemplary a flight profile and target angles in accordance with one embodiment of the inventive concepts disclosed herein.
Figure 6B:
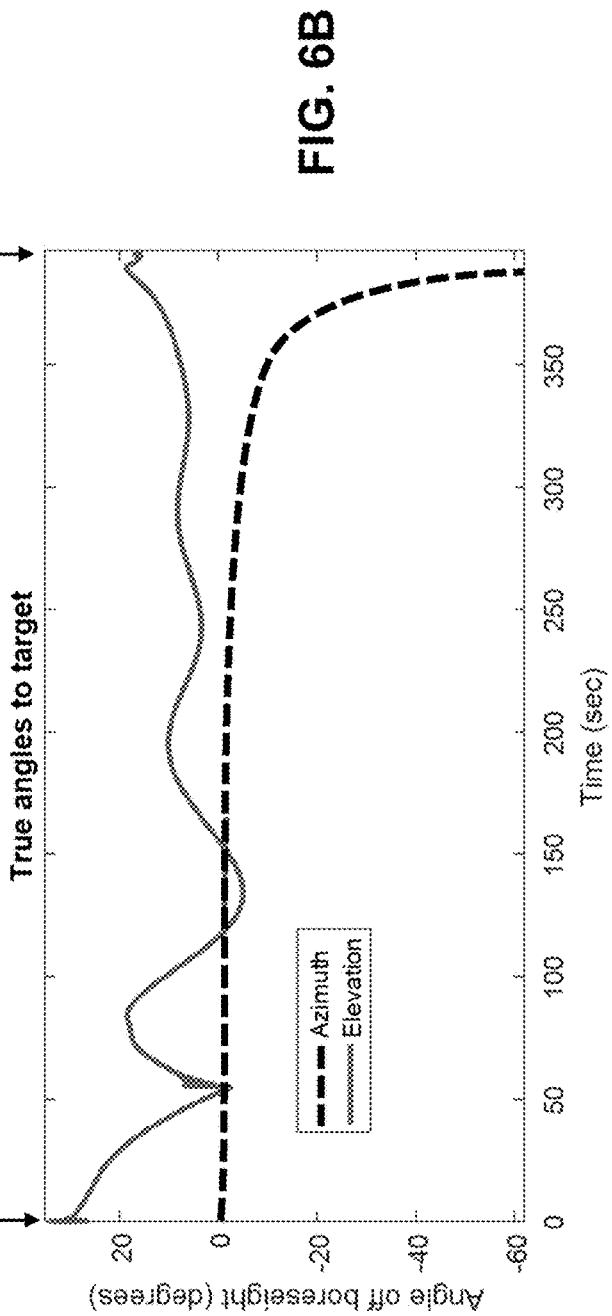

Referring now to FIGS. 6A and 6B, graphs of an exemplary flight profile 600 in accordance with one embodiment of the inventive concepts disclosed herein are shown. An exemplary flight 600 of the aerial vehicle 130 may include a time of flight of 400 seconds over a range of 120,000 ft from a launch point 602 to the surface target 604.

For example, at time 200 with range at approximately 60,000 ft, the azimuth angle is near zero (vehicle y axis pointing at the target), elevation angle is approximately +10 where the aerial vehicle 130 may pitch up slightly (e.g., aerial vehicle 130 y axis pointing above the target), and the aerial vehicle 130 altitude at approximately 10,000 ft.

For example, at time 0 at a launch point 602 when the aerial vehicle 130 is just launched in an exemplary flight profile, the elevation of the target (assumed fixed) relative to the y axis 162 may be at a highest point of +30 (e.g., 30 degrees below the direction of flight 172 of the aerial vehicle).

Although FIG. 6 may detail a single example useful to illuminate the DF capability in a flight path providing some angle diversity, time of flight, ranges, altitudes, etc are not limited to a similar use case. The WBDF aperture 120 may be directly applicable to a small UAV flight slow and level at a constant altitude, or a munition flying ballistic at supersonic speeds, or anything in between, as well as many other options.

FIG. 7 Azimuth and Elevation

Figure 7A:
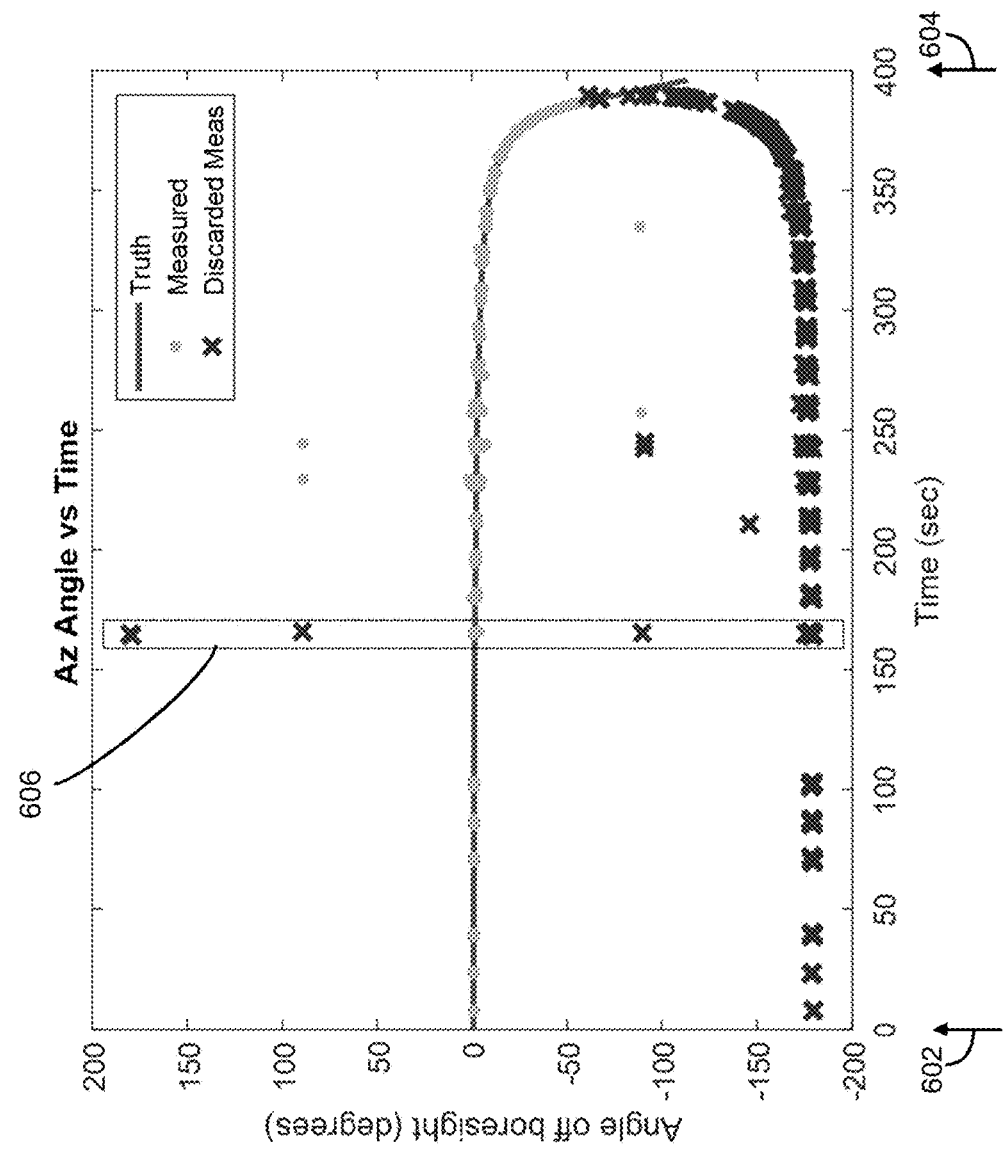
FIGS. 7A and 7B are graphs of an exemplary azimuth and elevation performance vs time with one embodiment of the inventive concepts disclosed herein.
Figure 7B:
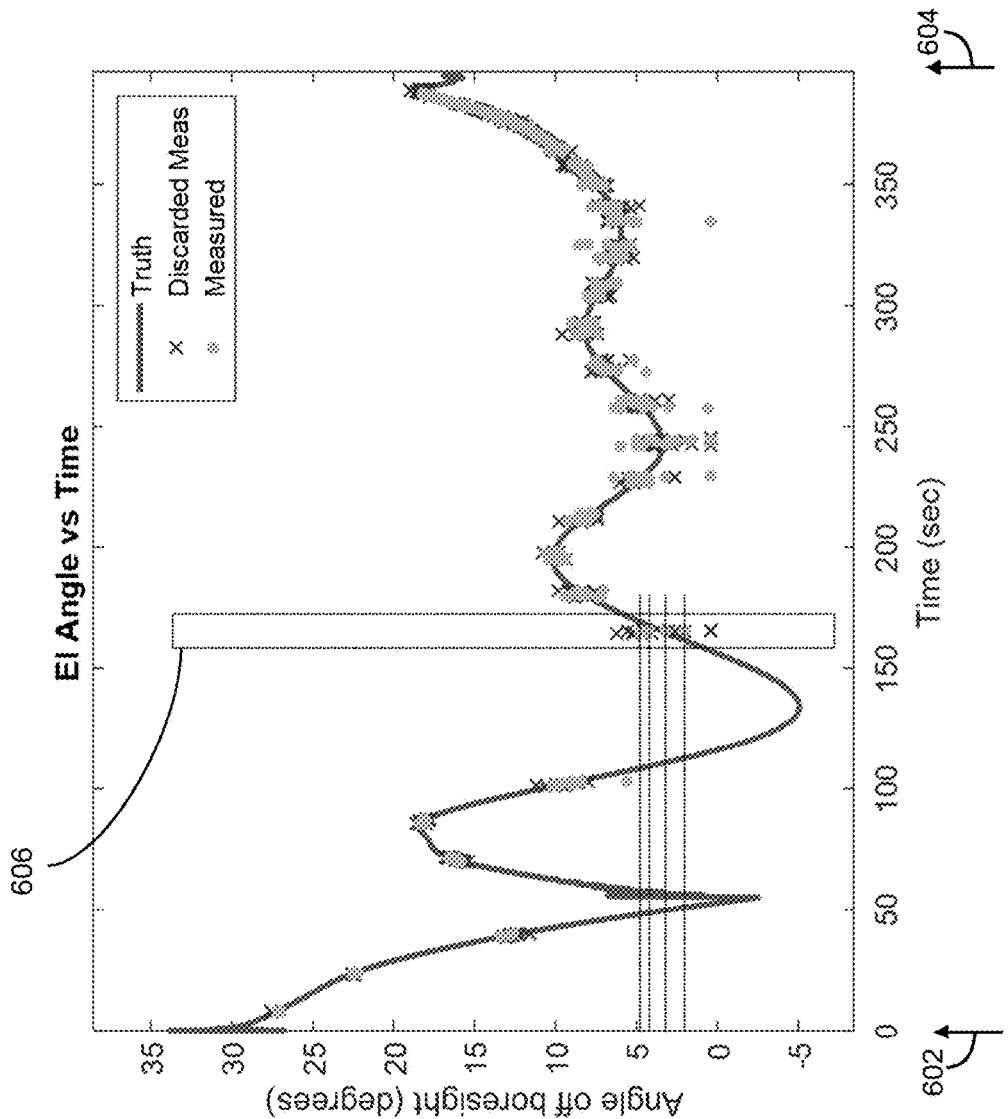

Referring now to FIGS. 7A and 7B, graphs 700 of an exemplary azimuth and elevation angles over time associated with one embodiment of the inventive concepts disclosed herein are shown. An exemplary sample time slice 606 may indicate one sample of measurements taken by the WBDF aperture 120.

FIG. 7A may indicate azimuth angle over time while FIG. 7B may indicate elevation angles over time. Each detection by the WBDF aperture 120 may have an associated azimuth and elevation pair. While a specific azimuth or elevation angle may be possible when considered individually, the pair of angles may be considered unrealistic in spherical coordinates, due to a projection into three-dimensional cartesian coordinates. FIGS. 7A and 7B may indicate measured angles individually, and discard the measurements that are considered unrealistic as a measurement pair. Each graph may represent angles relative to (or measured from) the forward direction 150 along they axis (e.g., boresight) of the planar array and at each specific time, a pair of measurement may be available for vehicle controller 522 or additional system analysis.

A truth curve may represent an actual azimuth and elevation of the target and discarded measurements may indicate those unrealistic measurements falling outside of a predetermined margin of error. With these azimuth and elevation pairs, a return from other than generally below and forward of the aerial vehicle 130 may be labeled as unrealistic and discarded In FIG. 7A, for example, at the sample time slice 606 at time 170, three azimuth measurements are each at approximately −1 degree of azimuth whereas two unrealistic measurements are +90 and −90 degrees right and left of the boresight. Two additional unrealistic measurements are each at +180 and −180 from the boresight (e.g., at the 6 o'clock position of the planar array) and also fall within the unrealistic measurements.

Referring now to FIG. 7B, at the same time slice 606, elevation angles relative to they axis may be indicated similar to FIG. 6B. Here, as the aerial vehicle 130 may fly a specific flight profile where a pitch of the aerial vehicle 130 may rise and fall indicated by the truth curve, the elevation measurements outside of a margin of error may be discarded as unrealistic. Indicated measurements of elevation angles of 5, 4, 3, and 2 may be considered valid while additional ambiguities at 0, +6 and +7 are removed as unrealistic. Most of the ambiguities may be false returns from above the aerial vehicle 130 rather than the desired look angles below the aerial vehicle 130.

FIG. 8 Angle Error

Figure 8:
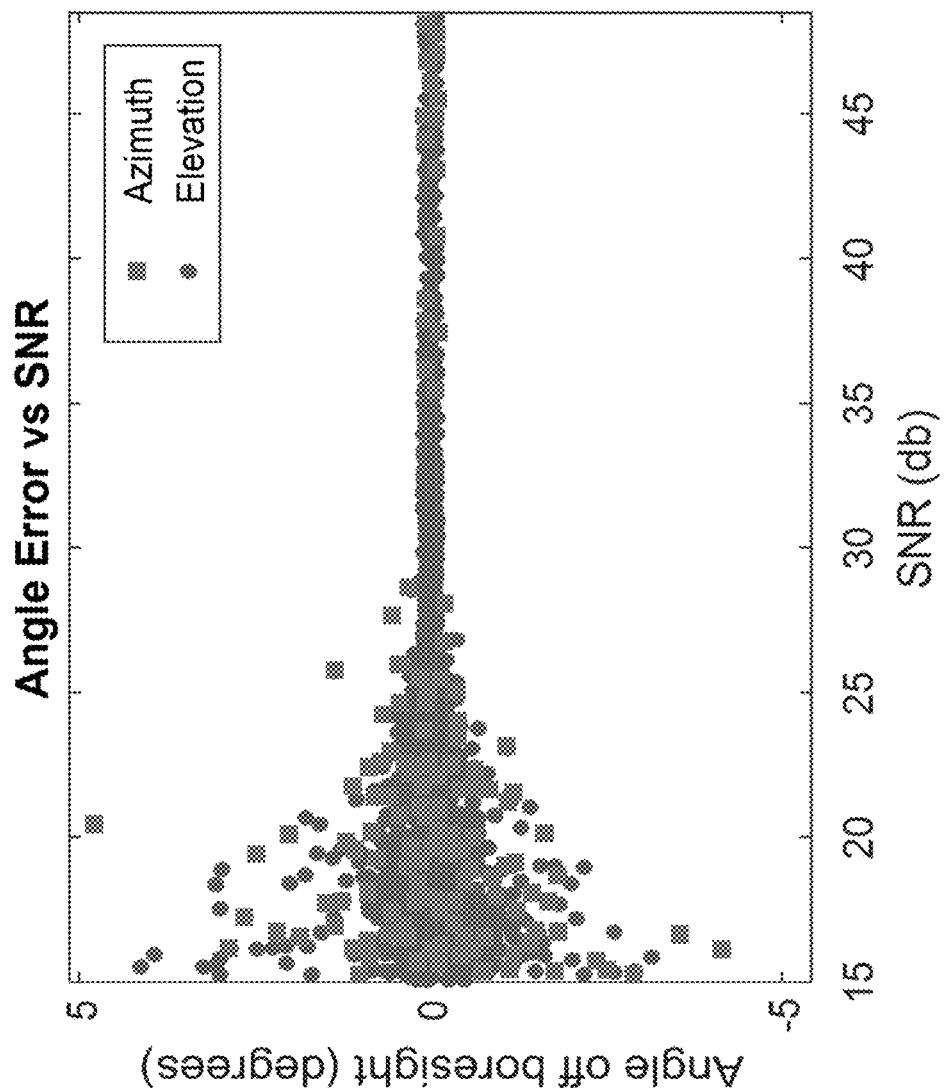
FIG. 8 is a diagram of exemplary angle error associated with one embodiment of the inventive concepts disclosed herein.

Referring now to FIG. 8, a diagram of exemplary angle error 800 exemplary of one embodiment of the inventive concepts disclosed herein is shown. FIG. 8 may indicate a resultant angle accuracy performance as a measure of SNR.

CONCLUSION

As will be appreciated from the above description, embodiments of the inventive concepts disclosed herein may provide a novel solution to a lightweight, small form factor antenna design capable of a wide frequency range and confident performance.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A wideband direction-finding aperture, comprising:
an array having at least four antenna elements, an array center point, an x axis, a y axis, and a z axis, wherein the at least four antenna elements are end-fire antenna elements with beam patterns oriented along the y axis, wherein the at least four antenna elements comprise:
   a first antenna element of a first size and having a first element center point;
   a second antenna element of the first size and having a second element center point;
   a third antenna element of the first size and having a third element center point; and
   a fourth antenna element of a second size and having a fourth element center point, wherein the second size is smaller than the first size;
the array configured, for a signal reception of a wide frequency bandwidth to enable a direction finding (DF) of a target, wherein the at least four antenna elements are oriented in a pattern, the pattern configured to limit at least one ambiguity associated with the signal reception, wherein the pattern comprises:
   the first element center point oriented a forward distance and a second right distance from the array center point;
   the second element center point oriented a second aft distance and a first right distance from the array center point;
   the third element center point oriented a first aft distance and a left distance from the array center point; and
   the fourth element center point oriented the first aft distance and a third right distance from the array center point, wherein the first aft distance is less than the second aft distance, wherein the forward distance is larger than the first aft distance and smaller than the second aft distance, wherein the first right distance is less than the second right distance, wherein the second right distance is less than the third right distance, wherein the third right distance is larger than the left distance, wherein the array center point is coincident to the x axis, the y axis, and the z axis, wherein forward and aft are opposing directions along the y axis, wherein left and right are opposing directions along the x axis.

2. The wideband direction-finding aperture of claim 1, wherein the array is operatively associated with an aerial vehicle and each antenna element of the array is 1) a directive, wide instantaneous bandwidth planar antenna including an elongate dielectric feed 2) configured for an insertion within an aperture cavity onboard the aerial vehicle, 3) configured to operatively couple with the aerial vehicle via a cable, and 4) shaped one of planar or conformal with the aperture cavity; wherein the y axis is parallel to a direction of flight of the aerial vehicle.

3. The wideband direction-finding aperture of claim 2, wherein the aerial vehicle further comprises one of: a munition, a manned or unmanned aerial vehicle, or a spacecraft.

4. The wideband direction-finding aperture of claim 1, wherein the array is a planar array and is aligned parallel with a plane defined by the y axis and the x axis.

5. The wideband direction-finding aperture of claim 1, wherein each antenna element of the at least four antenna elements is mounted adjacent to another antenna element of the array without an overlap and is configured for a field-of-view within 90 degrees of the y axis in azimuth and 90 degrees of the z axis in elevation.

6. The wideband direction-finding aperture of claim 1, wherein the array is one of active, passive, or semi-active.

7. The wideband direction-finding aperture of claim 1, wherein the first antenna element is further configured for the signal reception of a first segment of the wide frequency bandwidth, the second antenna element is further configured for the signal reception of a second segment of the wide frequency bandwidth, the third antenna element is further configured for the signal reception of a third segment of the wide frequency bandwidth, and the fourth antenna element is further configured for the signal reception of a fourth segment of the wide frequency bandwidth.

8. The wideband direction-finding aperture of claim 7, wherein each of the first segment through fourth segment of the wide frequency bandwidth is between 3-5 GHz wide, and wherein one of the first through the fourth segments of the wide frequency bandwidth includes a set of frequencies where a fractional bandwidth of the set of frequencies is greater than 1.

9. The wideband direction-finding aperture of claim 1, wherein each antenna element of the array further comprises a depth along the z axis of less than 0.25 inches.

10. The wideband direction-finding aperture of claim 1, wherein the forward distance is 1.0 to 2.0 inches, the first aft distance is 0.7 to 1.7 inches, and the second aft distance is 1.0 to 2.0 inches, the left distance is 0.8 to 1.8 inches, the first right distance is 0.1 to 1.1 inches, the second right distance is 0.1 to 1.1 inches, and the third right distance is 1.1 to 2.1 inches.

11. The wideband direction-finding aperture of claim 1, wherein the first size is 2.3 to 3.3 inches along the y axis by 0.9 to 1.9 inches along the x axis and the second size is 0.9 to 1.9 inches along the y axis by 0.2 to 1.2 inches along the x axis, the array is 4.7 to 6.7 inches along the y axis by 3.1 to 5.1 inches along the x axis.

12. The wideband direction-finding aperture of claim 1, wherein the first antenna element and the second antenna element overlap the y axis; wherein the third antenna element overlaps the x axis.

13. The wideband direction-finding aperture of claim 1, wherein the first size and the second size are rectangular.

14. A system for wideband direction finding, comprising:
a wideband direction-finding aperture comprising an array having at least four antenna elements, an array center point, an x axis, a y axis, and a z axis, wherein the at least four antenna elements are end-fire antenna elements with beam patterns oriented along the y axis, wherein the at least four antenna elements comprise:
   a first antenna element of a first size and having a first element center point;
   a second antenna element of the first size and having a second element center point;

a third antenna element of the first size and having a third element center point; and a fourth antenna element of a second size and having a fourth element center point, wherein the second size is smaller than the first size;

the array configured, for a signal reception of a wide frequency bandwidth to enable a direction finding (DF) of a target, the at least four antenna elements oriented in a pattern relative to an array center point, the pattern configured to limit an ambiguity associated with the signal reception, wherein the pattern comprises:

the first element center point oriented a forward distance and a second right distance from the array center point;

the second element center point oriented a second aft distance and a first right distance from the array center point;

the third element center point oriented a first aft distance and a left distance from the array center point; and the fourth element center point oriented the first aft distance and a third right distance from the array center point, wherein the first aft distance is less than the second aft distance, wherein the forward distance is larger than the first aft distance and smaller than the second aft distance, wherein the first right distance is less than the second right distance, wherein the second right distance is less than the third right distance, wherein the third right distance is larger than the left distance, wherein the array center point is coincident to the x axis, the y axis, and the z axis, wherein forward and aft are opposing directions along the y axis, wherein left and right are opposing directions along the x axis;

a vehicle controller operatively coupled with each of the at least four antenna elements;

a tangible, non-transitory memory configured to communicate with the vehicle controller, the tangible, non-transitory memory having instructions stored therein that, in response to execution by the vehicle controller, cause the vehicle controller to:

receive a combined signal from the array;

determine if at least one measurement from the combined signal is an unrealistic measurement based on at least one of an azimuth or an elevation associated with the at least one measurement;

discard the at least one unrealistic measurement as the ambiguity;

process the combined signal to determine an azimuth and an elevation of a target; and in response to the azimuth and elevation of the target, execute at least one vehicle function.

15. The system for wideband direction finding of claim 14, further including a down converter and digitizer configured to extract at least one feature from the combined signal and a direction finding processor operatively coupled with each of the down converter and the vehicle controller.

16. The system for wideband direction finding of claim 14, wherein the vehicle function comprises one of an autopilot command, a camera function, or a directive for semi-active radar function.

17. The system for wideband direction finding of claim 14, wherein the at least one measurement further comprises an azimuth measurement coupled with an elevation measurement and wherein the vehicle controller is configured to analyze each of the azimuth measurement and elevation measurement to determine the ambiguity within the signal reception.

18. The system for wideband direction finding of claim 14, wherein the vehicle controller is further configured to discard a first measurement and at least one second measurement as the ambiguity within the signal reception.

19. An aerial vehicle wideband direction finder, comprising:

a wideband direction-finding aperture comprising an array having at least four antenna elements, an array center point, an x axis, a y axis, and a z axis, and operatively associated with the aerial vehicle, wherein the at least four antenna elements are end-fire antenna elements with beam patterns oriented along the y axis, wherein the at least four antenna elements comprise:

a first antenna element of a first size and having a first element center point;

a second antenna element of the first size and having a second element center point;

a third antenna element of the first size and having a third element center point; and a fourth antenna element of a second size and having a fourth element center point, wherein the second size is smaller than the first size;

the array configured, for a signal reception for a wide frequency bandwidth to enable a direction finding (DF) of a target and produce a combined signal, the at least four antenna elements are non-overlapping and adjacent to at least one other antenna element, wherein the at least four antenna elements are oriented in a pattern, the pattern configured to limit at least one ambiguity associated with the signal reception, wherein the pattern comprises:

the first element center point oriented a forward distance and a second right distance from the array center point;

the second element center point oriented a second aft distance and a first right distance from the array center point;

the third element center point oriented a first aft distance and a left distance from the array center point; and the fourth element center point oriented the first aft distance and a third right distance from the array center point, wherein the first aft distance is less than the second aft distance, wherein the forward distance is larger than the first aft distance and smaller than the second aft distance, wherein the first right distance is less than the second right distance, wherein the second right distance is less than the third right distance, wherein the third right distance is greater than the left distance, wherein the array center point is coincident to the x axis, the y axis, and the z axis, wherein forward and aft are opposing directions along the y axis, wherein left and right are opposing directions along the x axis;

a vehicle controller operatively coupled with each of the at least four antenna elements;

a tangible, non-transitory memory configured to communicate with the vehicle controller, the tangible, non-transitory memory having instructions stored therein that, in response to execution by the vehicle controller, cause the vehicle controller to:

determine if at least one measurement from the combined signal is an unrealistic measurement based on at least one of an azimuth or an elevation;

discard the at least one unrealistic measurement as an ambiguity;
process the combined signal to determine an azimuth and an elevation of a target; and
in response to the azimuth and elevation of the target, execute at least one vehicle function.

\* \* \* \* \*